(12) United States Patent
Tang

(10) Patent No.: US 12,137,439 B2
(45) Date of Patent: Nov. 5, 2024

(54) METHOD, DEVICE, STORAGE MEDIUM AND SYSTEM FOR RESOURCE INDICATION

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 179 days.

(21) Appl. No.: 16/644,469

(22) PCT Filed: Sep. 6, 2017

(86) PCT No.: PCT/CN2017/100738
§ 371 (c)(1),
(2) Date: Mar. 4, 2020

(87) PCT Pub. No.: WO2019/047068
PCT Pub. Date: Mar. 14, 2019

(65) Prior Publication Data
US 2021/0092736 A1 Mar. 25, 2021

(51) Int. Cl.
*H04W 72/0446* (2023.01)
*H04W 72/53* (2023.01)

(52) U.S. Cl.
CPC ....... *H04W 72/0446* (2013.01); *H04W 72/53* (2023.01)

(58) Field of Classification Search
CPC ............ H04W 72/0446; H04W 72/0493
See application file for complete search history.

(56) References Cited

U.S. PATENT DOCUMENTS 9,265,068 B2 2/2016 Han
10,517,078 B2 * 12/2019 Kim .................. H04W 72/12
(Continued)

FOREIGN PATENT DOCUMENTS

CN 101291172 A 10/2008
CN 102740473 A 10/2012
(Continued)

OTHER PUBLICATIONS

MCC Support; "Final Report of 3GPP TSG RAN WG1 #90 v1.0.0" (Prague, Czech Rep, Aug. 21-25, 2017), 3GPP TSG RAN WG1 Meeting #90bis, R1-1716941, Prague, Czech Rep, Oct. 9-13, 2017.
(Continued)

*Primary Examiner* — Michael Thier
*Assistant Examiner* — Nevena Zecevic Sandhu
(74) *Attorney, Agent, or Firm* — PERKINS COIE LLP

(57) ABSTRACT

A resource indication method, and a device, are provided. The method includes that: a first network device sends first signaling to a second network device, the first signaling including N pieces of indication information for indicating symbol-level configuration information, the first signaling being for configuring more than N slots according to N pieces of symbol-level configuration information and the symbol-level configuration information being for configuring a symbol for data transmission in a slot; and the first network device performs data transmission with the second network device according to the symbol-level configuration information corresponding to the indication information in the first signaling. It is not required to indicate symbol-level configuration information of each slot, thereby reducing a signaling overhead. It is not required to uniformly indicate symbol-level configuration information of all the slots either, thus improving symbol-level configuration flexibility.

12 Claims, 11 Drawing Sheets

A first network device sends first signaling to a second network device — S301

The first network device performs data transmission with the second network device according to symbol-level configuration information corresponding to indication information in the first signaling — S302

(56) References Cited

U.S. PATENT DOCUMENTS

| | | | |
|---|---|---|---|
| 2011/0305226 | A1 | 12/2011 | Zhang |
| 2015/0189677 | A1 | 7/2015 | Han et al. |
| 2016/0057753 | A1 | 2/2016 | Yang et al. |
| 2018/0132229 | A1* | 5/2018 | Li .................... H04L 5/0053 |
| 2019/0268946 | A1* | 8/2019 | Harada ................ H04W 74/02 |
| 2020/0236732 | A1* | 7/2020 | Liu .................. H04W 72/0446 |

FOREIGN PATENT DOCUMENTS

| | | | |
|---|---|---|---|
| CN | 102781095 | A | 11/2012 |
| CN | 103209489 | A | 7/2013 |
| CN | 104782062 | A | 7/2015 |
| KR | 20110114448 | A | 10/2011 |
| KR | 20120038399 | A | 4/2012 |
| KR | 20140071948 | A | 6/2014 |
| WO | 2013147430 | A1 | 10/2013 |
| WO | 2016115683 | A1 | 7/2016 |
| WO | 2017113335 | A1 | 7/2017 |

OTHER PUBLICATIONS

Written Opinion of the International Search Authority in the international application No. PCT/CN2017/100738, mailed on Dec. 27, 2017.
First Office Action of the Korean application No. 10-2020-7006187, issued on Oct. 8, 2021. 11 pages with English translation.
First Office Action of the Chilean application No. 202000377, issued on May 20, 2021.
Office Action of the Indian application No. 202017014995, issued on Jun. 30, 2021.
LG Electronics, Discussion on time-domain resource allocation[online], 3GPP TSG RAN WG1 #90 R1-1713186, Internet<URL:http://www.3gpp.org/ftp/tsg_ran/WG1_RL1/TSGR1_90/Docs/R1-1713186.zip>, Aug. 25, 2017.
First Office Action of the Japanese application No. 2020-512694, issued on Jul. 13, 2021.
Supplementary European Search Report in the European application No. 21177980.6, mailed on Jul. 16, 2021.
International Search Report in the international application No. PCT/CN2017/100738, mailed on Dec. 27, 2017.
Supplementary International Search Report in the international application No. PCT/CN2017/100738, mailed on Sep. 6, 2017.
Samsung: "DL/UL Time Resource Allocation", 3GPP Draft; R1-1713636_DLUL Time Resource Allocation_F, 3rd Generation Partnership Project(3GPP), Mobile Competence Centre; 650, Route Des Lucioles; F-06921 Sophia-Antipolis Cedex; France, vol. RAN WG1, No. Prague, Czechia; Aug. 21, 2017-Aug. 25, 2017 Aug. 20, 2017(2017-08-20), XP051316436, Retrieved from the Internet: URL: http://www.3gpp.org/ftp/Meetings_3GPP_SYNC/RAN1/Docs/ <retrieved on Aug. 20, 2017> *the whole document*.
CATR: "Discussion on the scheduling of time domain resource", 3GPP Draft; R1-1714229, 3rd Generation Partnership Project(3GPP), Mobile Competence Centre; 650, Route Des Lucioles; F-06921 Sophia-Antipolis Cedex; France, vol. RAN WG1, No. Prague, Czechia; Aug. 21, 2017-Aug. 25, 2017 Aug. 20, 2017 (Aug. 20, 2017), XP051317017, Retrieved from the Internet: URL: http://www.3gpp.org/ftp/Meetings_3GPP_SYNC/ RAN1/Docs/ <retrieved on Aug. 20, 2017> *the whole document*.
CATT: "NR DL/UL time domain resource allocation", 3GPP Draft; R1-1712411, 3rd Generation Partnership Project(3GPP), Mobile Competence Centre; 650, Route Des Lucioles; F-06921 Sophia-Antipolis Cedex; France, vol. RAN WG1, No. Prague, Czechia; Aug. 21, 2017-Aug. 25, 2017 Aug. 20, 2017(Aug. 20, 2017), XP051315227, Retrieved from the Internet: URL: http://www.3gpp.org/ftp/Meetings_3GPP_SYNC/RAN1/Docs/ <retrieved on Aug. 20, 2017> *the whole document*.
Huawei et al: "Discussion on data transmission duration", 3GPP Draft; R1-1712208, 3rd Generation Partnership Project(3GPP), Mobile Competence Centre; 650, Route Des Lucioles; F-06921 Sophia-Antipolis Cedex; France, vol. Ran WG1, No. Prague, Czech Republic; Aug. 21, 2017-Aug. 25, 2017 Aug. 20, 2017(Aug. 20, 2017), XP051315025, Retrieved from the Internet: URL: http://www.3gpp.org/ftp/Meetings_3GPP_SYNC/RAN1/Docs/ <retrieved on Aug. 20, 2017> *the whole document*.
Notice of Allowance of the Korean application No. 10-2020-7006187, issued on Apr. 25, 2022. 3 pages with English Translation.
Notice of Rejection of the Korean application No. 10-2020-7006187, issued on Mar. 18, 2022. 7 pages with English Translation.
Second Office Action of the Japanese application No. 2020-512694, issued on Dec. 24, 2021. 6 pages with English translation.
First Office Action of the Israeli application No. 272758, issued on Sep. 13, 2022. 7 pages.
First Office Action of the Chinese application No. 2020101079247, issued on Nov. 14, 2022. 12 pages with English translation.
Huawei, HiSilicon "Resource allocation and indication for data channel" 3GPP TSG RAN WG1 Meeting #88bis R1-1705069, Spokane, USA, Apr. 3-7, 2017. 8 pages.
Notice of Allowance of the Chinese application No. 202010107924.7, issued on Mar. 28, 2023. 5 pages with English translation.
First Office Action of the Chinese application No. 201780092608.3, issued on May 23, 2024. 12 pages with English translation.
First Office Action of the Malaysian application No. PI2020000921, issued on May 22, 2024. 5 pages.

* cited by examiner

METHOD, DEVICE, STORAGE MEDIUM AND SYSTEM FOR RESOURCE INDICATION

CROSS-REFERENCE TO RELATED APPLICATIONS

The present application is a U.S. National Phase Entry of International PCT Application No. PCT/CN2017/100738 filed on Sep. 6, 2017, and named after "METHOD, DEVICE, STORAGE MEDIUM AND SYSTEM FOR RESOURCE INDICATION", the content of which is hereby incorporated by reference in its entirety.

TECHNICAL FIELD

The disclosure relates to the technical field of wireless communication, and particularly, to a method, a device, a storage medium and a system for resource indication.

BACKGROUND

Researches on 5th Generation (5G) have been made with the development of communication technologies. Radio access of 5G is called New Radio (NR). 5G is required to support ultrahigh data transmission rates, massive data connections and relatively low data transmission delays, therefore, for improving flexibility of resource allocation and reducing delay in data transmission, symbol-level resource allocation is introduced into a 5G NR system, compared with a presently adopted Long Term Evolution (LTE) system, to improve flexibility of a time-domain position of a channel.

With introduction of the symbol-level resource allocation, a time-domain position of a data channel such as a Physical Downlink Shared Channel (PDSCH) and a Physical Uplink Shared Channel (PUSCH) may be achieved, which takes a symbol as a unit. One PDSCH or PUSCH may use part of symbols in one slot only. Therefore, a 5G gNB is required to indicate information about a symbol to be used in one slot to a terminal. During multi-slot scheduling or slot aggregation scheduling, the gNB is required to indicate and configure information about a symbol to be used in each one of multiple slots. A specific manner may include that: different starting or terminal symbols are configured for each scheduled slot respectively; or a unified symbol configuration is adopted for all the scheduled slots.

Therefore, a present solution for indicating and configuring each of multiple slots may bring an extremely high signaling overhead on one hand, and on the other hand, cannot flexibly configure symbols in different slots.

SUMMARY

For solving the technical problem, embodiments of the disclosure are to provide a resource indication method, a device, a storage medium and a system, which can not only reduce a signaling overhead but also improve symbol configuration flexibility.

The technical solutions of the embodiments of the disclosure are implemented as follows.

According to a first aspect, an embodiment of the disclosure provides a resource indication method, which may include the following operations.

A first network device sends first signaling to a second network device, the first signaling including N pieces of indication information for indicating symbol-level configuration information, the first signaling being for configuring more than N slots according to N pieces of symbol-level configuration information and the symbol-level configuration information being for configuring a symbol for data transmission in each of the slots; and the first network device performs data transmission with the second network device according to the symbol-level configuration information corresponding to the indication information in the first signaling.

According to a second aspect, an embodiment of the disclosure provides a resource indication method, which may include the following operations.

A second network device receives first signaling from a first network device, the first signaling including N pieces of indication information for indicating symbol-level configuration information, the first signaling being for configuring more than N slots according to N pieces of symbol-level configuration information and the symbol-level configuration information being for configuring a symbol for data transmission in each of the slots.

The second network device performs data transmission with the first network device according to the symbol-level configuration information corresponding to the indication information in the first signaling.

According to a third aspect, an embodiment of the disclosure provides a network device, which may include a sending part and a first data transmission part.

Herein, the sending part may be configured to send first signaling to a second network device, the first signaling including N pieces of indication information for indicating symbol-level configuration information, the first signaling being for configuring more than N slots according to N pieces of symbol-level configuration information and the symbol-level configuration information being for configuring a symbol for data transmission in each of the slots.

The first data transmission part may be configured to perform data transmission with the second network device according to the symbol-level configuration information corresponding to the indication information in the first signaling.

According to a fourth aspect, the embodiments of the disclosure provide a network device, which may include a receiving part and a second data transmission part.

The receiving part may be configured to receive first signaling from a first network device.

Herein, the first signaling may include N pieces of indication information for indicating symbol-level configuration information, the first signaling may be configured to configure more than N slots according to N pieces of symbol-level configuration information, and the symbol-level configuration information may be for configuring a symbol for data transmission in each of the slots.

The second data transmission part may be configured to perform data transmission with the first network device according to the symbol-level configuration information corresponding to the indication information in the first signaling. According to a fifth aspect, an embodiment of the disclosure provides a network device, which may include a first network interface, a first memory and a first processor.

The first network interface may be configured to receive and send a signal in a process of receiving and sending information from and to an external network element.

The first memory may be configured to store a computer program capable of running in the first processor.

The first processor may be configured to run the computer program to execute the steps of any method in the first aspect.

According to a sixth aspect, an embodiment of the disclosure provides a network device, which may include a second network interface, a second memory and a second processor.

Herein, the second network interface may be configured to receive and send a signal in a process of receiving and sending information from and to an external network element.

The second memory may be configured to store a computer program capable of running in the second processor.

The second processor may be configured to run the computer program to execute the steps of any method in the second aspect.

According to a seventh aspect, an embodiment of the disclosure provides a computer-readable medium, which may store a resource indication program, the resource indication program being executable by at least one processor to implement the steps of any method in the first aspect.

According to an eighth aspect, an embodiment of the disclosure provides a computer-readable medium, which may store a resource indication program, the resource indication program being executable by at least one processor to implement the steps of any method in the second aspect.

According to a ninth aspect, an embodiment of the disclosure provides a resource indication system, which may include a first network device and a second network device.

The first network device may be configured to send first signaling to the second network device, the first signaling including N pieces of indication information for indicating symbol-level configuration information, the first signaling being for configuring more than N slots according to N pieces of symbol-level configuration information and the symbol-level configuration information being for configuring a symbol for data transmission in each of the slots, and perform data transmission with the second network device according to the symbol-level configuration information corresponding to the indication information in the first signaling.

The second network device may be configured to receive the first signaling from the first network device, and perform data transmission with the first network device according to the symbol-level configuration information corresponding to the indication information in the first signaling.

According to the resource indication method, device, storage medium and system provided in the embodiments of the disclosure, the amount of indication information is smaller than the number of slots to be configured, so that symbol-level configuration may be performed for data transmission of M slots according to N pieces of indication information, M being larger than N. Therefore, symbol-level time-domain resource configuration may be performed on part of slots according to an indication of the indication information, and a unified symbol-level time-domain resource configuration may be adopted for the other part of the slots. It is not required to indicate the symbol-level configuration information of each slot to be configured, so that a signaling overhead is reduced. It is not required to uniformly indicate the symbol-level configuration information of all the slots to be configured either, so that flexibility of symbol-level configuration is improved.

DETAILED DESCRIPTION

In the present related art, during multi-slot or slot aggregation scheduling, a base station may adopt the following two solutions to indicate information about a symbol to be used by each of multiple slots.

Solution 1

Figure 1:
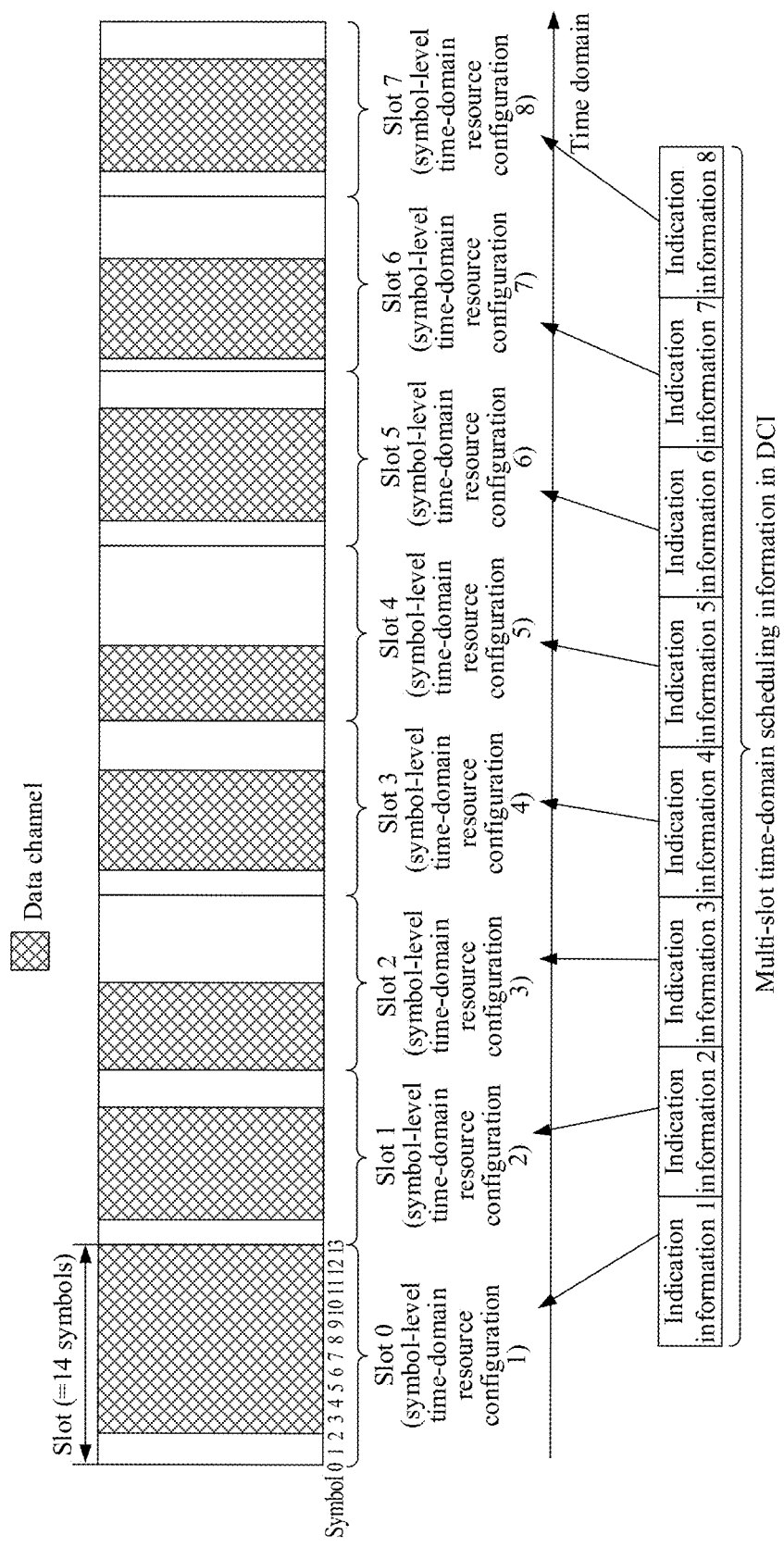
FIG. 1 is a schematic diagram of slot indication according to a related art.

Referring to schematic slot indication shown in FIG. 1, it is set that a start symbol and a terminal symbol are configured for each scheduled slot. Thus it can be seen that different symbol-level time-domain resource configurations are adopted for different slots, and the base station may indicate the symbol-level time-domain resource configurations corresponding to different slots through different indication information in Downlink Control Information (DCI) respectively.

When the technical solution in Solution 1 is adopted, a signaling overhead may be increased. As shown in FIG. 1, for example, for a PDSCH aggregated with 8 slots, since each scheduled slot may have different start symbols and terminal symbols, symbol-level time-domain resource configurations corresponding to each scheduled slot are indicated through different indication information in the DCI, and the amount of the indication information in the DCI is 8. Thus it can be seen that, compared with a signaling overhead in resource configuration indication in an LTE system, the signaling overhead may be 8 times the signaling overhead in resource configuration indication in the LTE system.

For reducing the signaling overhead, Solution 2 is disclosed in the present related art.

Figure 2:
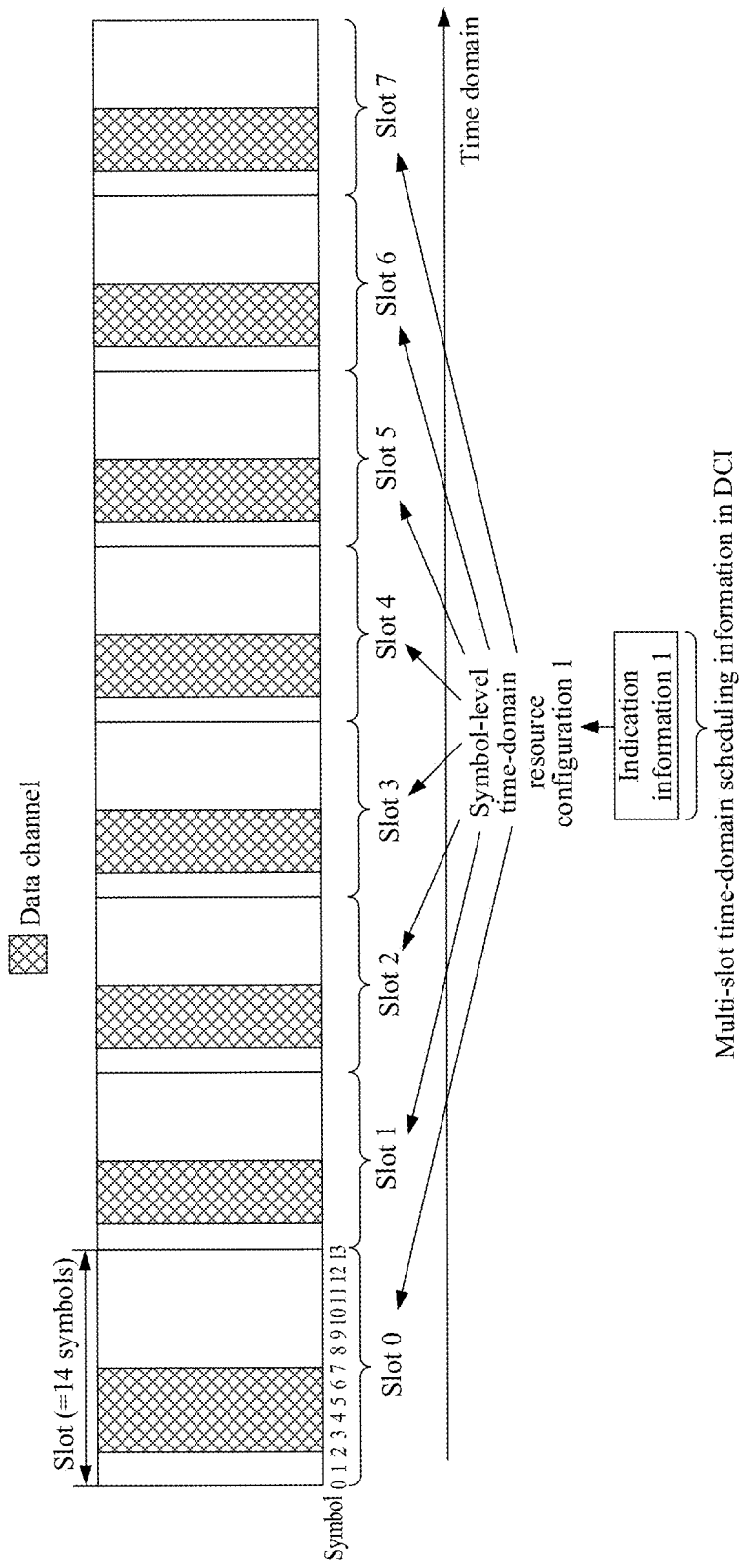
FIG. 2 is another schematic diagram of slot indication according to the related art.

Referring to schematic slot indication shown in FIG. 2, it is set that a start symbol and a terminal symbol are configured for each scheduled slot respectively and that the start symbol and terminal symbol configured for each scheduled slot are the same, that is, the same symbol-level time-domain resource configuration is adopted for all the scheduled slots. Therefore, the DCI adopted by the base station includes indication information only. As shown in FIG. 2, still taking the PDSCH aggregated with the 8 slots as an example, since the unified starting terminal and terminal symbol are configured for each scheduled slot, the amount of the indication information in the DCI is 1. Compared with Solution 1, Solution 2 has the advantage that the signaling overhead is reduced. However, the symbol-level configuration of each slot is mandatorily unified, the technical solution of Solution 2 may bring less configuration flexibility.

For the problems of the two solutions in the related art, the problems will be solved below through the following embodiments in combination with the drawings in the embodiments of the disclosure.

Embodiment 1

Figure 3:
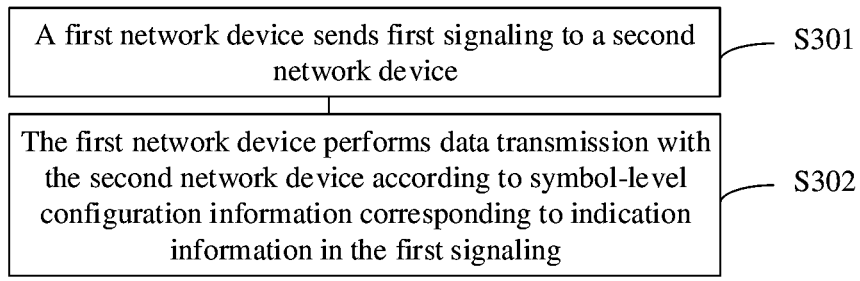
FIG. 3 is a flowchart of a resource indication method according to an embodiment of the disclosure.

Referring to FIG. 3, a resource indication method provided in the embodiment of the disclosure is illustrated. The method may include the following operations.

In S301, a first network device sends first signaling to a second network device.

Herein, the first signaling includes N pieces of indication information configured to indicate corresponding symbol-level configuration information, the first signaling is for configuring more than N slots according to N pieces of symbol-level configuration information, and the symbol-level configuration information is for configuring a symbol for data transmission in each of the slots.

It is to be explained that, in the embodiment and subsequent embodiments, network devices refer to devices in a network environment and thus the network devices may be divided into user equipment and network-side devices. The user equipment may specifically be a terminal device such as a cell phone, a smart phone, a Session Initiation Protocol (SIP) phone, a laptop computer, a Personal Digital Assistant (PDA), satellite radio, a global positioning system, a multimedia device, a video device, a digital audio player (for example, a Moving Picture Experts Group Audio Layer-3 (MP3) player), a camera, a game console, a tablet computer or any other device with a similar function. The network-side device may be a core network device or an access network device such as a base station.

In S302, the first network device performs data transmission with the second network device according to the symbol-level configuration information corresponding to the indication information in the first signaling.

For example, the symbol-level configuration information may include a start symbol and a terminal symbol for data transmission in a slot, or may also include a start symbol for data transmission in a slot and a symbol length, or may include a bitmap indicating a symbol for data transmission in a slot to be configured. For the bitmap, it is to be explained that each bit of the bitmap corresponds to one symbol; when the bit is 1, it is indicated that the symbol corresponding to the bit is configured for data transmission, and when the bit is 0, it is indicated that the symbol corresponding to the bit is not configured for data transmission. It can be understood that any configuration information for symbol-level data transmission in a slot may be called symbol-level configuration information.

It is to be noted that, in the technical solution shown in FIG. 3, the amount of the indication information is smaller than the number of the more than N slots to be configured, so that, compared with Solution 1 in the related art, the technical solution has the advantage that a signaling overhead is reduced, and compared with Solution 2 in the related art, the technical solution has the advantages that unified configuration information is not needed for all the slots to be configured and flexibility of symbol-level configuration of the slots is further improved.

For the first signaling in the technical solution shown in FIG. 3, in a possible implementation mode, when the number of the slots to be configured is M and M is larger than N, N−1 pieces of first indication information in the N pieces of indication information of the first signaling correspond to the symbol-level configuration information of N−1 first slots in the M slots; and second indication information, other than the first indication information, in the N pieces of indication information corresponds to the symbol-level configuration information of M−N+1 second slots, other than the first slots, in the M slots.

For the first signaling in the technical solution shown in FIG. 3, in a possible implementation mode, when the number of the slots to be configured is M, the N pieces of indication information of the first signaling correspond to the symbol-level configuration information of N third slots in the M slots; and the symbol-level configuration information of M−N fourth slots other than the third slots in the M slots is default symbol-level configuration information.

Specifically, the default symbol-level configuration information is predefined symbol-level configuration information, or is symbol-level configuration information configured by System Information (SI) or Radio Resource Control (RRC) signaling.

In a specific implementation process, the first signaling may be born in DCI or born in a Media Access Control (MAC) Control Element (CE).

For the technical solution shown in FIG. 3, the second network device determines the symbol-level configuration information corresponding to the slots to be configured through the indication information in the first signaling, therefore, before S301, the symbol-level configuration information is required to be notified to the second network device to enable the second network device to have a certain amount of symbol-level configuration information and further enable the second network device to determine the symbol-level configuration information through the indication information. Therefore, in a possible implementation mode, before S301, the method may further include the following operation:

the first network device sends second signaling to the second network device.

Herein, the second signaling may include P pieces of symbol-level configuration information, and each piece of indication information in the N pieces of indication information in the first signaling corresponds to a piece of symbol-level configuration information in the P pieces of symbol-level configuration information.

Specifically, each piece of indication information in the N pieces of indication information may indicate an index of a piece of symbol-level configuration information in the P pieces of symbol-level configuration information. The index may uniquely distinguish certain symbol-level configuration information from the P pieces of symbol-level configuration information, therefore, when each piece of indication information in the indication information indicates the index of the corresponding symbol-level configuration information, each piece of indication information in the N pieces of indication information in the first signaling may be enabled to correspond to a piece of symbol-level configuration information in the P pieces of symbol-level configuration information. It can be understood that, each piece of indication information in the N pieces of indication information has corresponding symbol-level configuration information in the P pieces of symbol-level configuration information, therefore, P is usually not smaller than N. In such case, the P pieces of symbol-level configuration information may form a set of alternative symbol-level configuration information indicated by indication information.

In combination with the abovementioned possible implementation modes and the technical solution shown in FIG. 3, in a possible implementation mode, when the number of the slots to be configured is M and M is larger than N, the N−1 pieces of first indication information in the N pieces of indication information of the first signaling correspond to the symbol-level configuration information of the N−1 first slots in the M slots; and the second indication information, other than the first indication information, in the N pieces of indication information corresponds to the symbol-level configuration information of the M−N+1 second slots, other than the first slots, in the M slots.

Therefore, the symbol-level configuration information of the first slots corresponds to the symbol-level configuration information indicated by the first indication information, and the symbol-level configuration information of the second slots is the symbol-level configuration information indicated by the second indication information. Moreover, the symbol-level configuration information indicated by the first indication information is the symbol-level configuration information corresponding to the first indication information in the P pieces of symbol-level configuration information, and the symbol-level configuration information indicated by the second indication information is the symbol-level configuration information corresponding to the first indication information in the P pieces of symbol-level configuration information in the second signaling.

In combination with the abovementioned implementation modes and the technical solution shown in FIG. 3, in a possible implementation mode, when the number of the slots to be configured is M, the N pieces of indication information of the first signaling correspond to the symbol-level configuration information of the N third slots in the M slots; and the symbol-level configuration information of the M−N fourth slots other than the third slots in the M slots is preset symbol-level configuration information in the P pieces of symbol-level configuration information.

In the specific implementation process, the second signaling may be born in RRC signaling or born in MAC CE.

According to the technical solution, the transmitted first signaling includes N pieces of indication information, the number of the slots to be configured is M, and M is larger than N. Therefore, symbol-level configuration may be made for data transmission of the M slots according to the N pieces of indication information, without indicating symbol-level configuration information of each slot to be configured, so that a signaling overhead is reduced. The symbol-level configuration information of all the slots to be configured is not required to be indicated uniformly either, so that flexibility of symbol-level configuration is improved.

Embodiment 2

Figure 4:
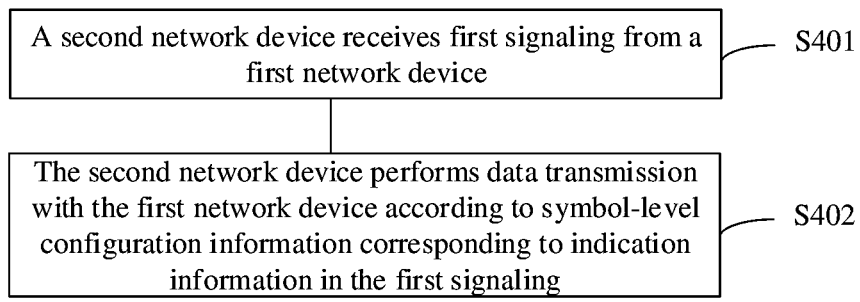
FIG. 4 is a flowchart of another resource indication method according to an embodiment of the disclosure.

On the basis of the same inventive concept of the abovementioned embodiment, referring to FIG. 4, another resource indication method provided in the embodiment of the disclosure is illustrated. The method is for the second network device opposite to the first network device in the abovementioned embodiment. The method may include the following steps.

In S401, the second network device receives first signaling from the first network device.

Herein, the first signaling includes N pieces of indication information configured to indicate corresponding symbol-level configuration information, the first signaling is for configuring more than N slots according to the N pieces of symbol-level configuration information, and the symbol-level configuration information is for configuring a symbol for data transmission in a slot.

In S402, the second network device performs data transmission with the first network device according to the symbol-level configuration information corresponding to the indication information in the first signaling.

Specifically, when the number of the slots to be configured is M and M is larger than N, N−1 pieces of first indication information in the N pieces of indication information of the first signaling correspond to the symbol-level configuration information of N−1 first slots in the M slots; and second indication information, other than the first indication information, in the N pieces of indication information corresponds to the symbol-level configuration information of M−N+1 second slots other than the first slots in the M slots.

Specifically, when the number of the slots to be configured is M, N pieces of indication information of the first signaling correspond to symbol-level configuration information of N third slots in the M slots; symbol-level configuration information of M−N fourth slots other than the third slots in the M slots is default symbol-level configuration information; and the default symbol-level configuration information may be predefined symbol-level configuration information, or may be symbol-level configuration information configured by RRC signaling or configured by SI. For example, the second network device, after receiving the RRC signaling or the SI and parsing the RRC signaling or the SI, may obtain the default symbol-level configuration information configured in the RRC signaling or the SI.

In a specific implementation process, the first signaling may be born in DCI or born in a Media Access Control (MAC) Control Element (CE).

In a possible implementation mode, before S401, the method may further include the following operation.

The second network device may receive second signaling from the first network device.

Herein, the second signaling may include P pieces of symbol-level configuration information, and each piece of indication information in the N pieces of indication information in the first signaling corresponds to a piece of symbol-level configuration information in the P pieces of symbol-level configuration information respectively.

Specifically, when the number of the slots to be configured is M and M is larger than N, N−1 pieces of first indication information in N pieces of indication information of the first signaling correspond to symbol-level configuration information of N−1 first slots in the M slots; and second indication information, other than the first indication information, in the N pieces of indication information corresponds to symbol-level configuration information of M−N+1 second slots, other than the first slots, in the M slots.

Therefore, the symbol-level configuration information of the first slots corresponds to the symbol-level configuration information indicated by the first indication information, and the symbol-level configuration information of the second slots is the symbol-level configuration information indicated by the second indication information. Moreover, the symbol-level configuration information indicated by the first indication information is the symbol-level configuration information corresponding to the first indication information in the P pieces of symbol-level configuration information, and the symbol-level configuration information indicated by the second indication information is the symbol-level configuration information corresponding to the first indication information in the P pieces of symbol-level configuration information in the second signaling.

Specifically, when the number of the slots to be configured is M, N pieces of indication information of the first signaling correspond to symbol-level configuration information of N third slots in the M slots; and symbol-level configuration information of M−N fourth slots, other than the third slots, in the M slots is preset symbol-level configuration information in the P pieces of symbol-level configuration information.

In the specific implementation process, the second signaling may be born in RRC signaling or born in an MAC CE.

According to the technical solution, the second network device, after receiving first signaling or receiving first signaling and second signaling, may perform symbol-level configuration for data transmission of M slots according to N pieces of indication information, without indicating the symbol-level configuration information of each slot to be configured, so that a signaling overhead is reduced. The symbol-level configuration information of all the slots to be configured is not required to be indicated uniformly, so that symbol-level configuration flexibility is improved.

Embodiment 3

Figure 5:
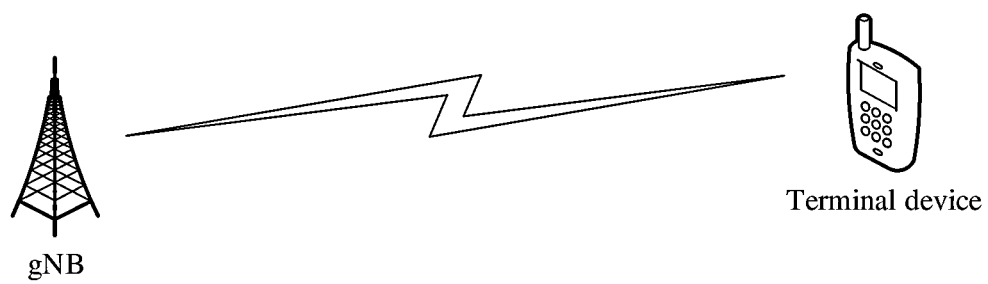
FIG. 5 is a schematic diagram of an application scenario according to an embodiment of the disclosure.

On the basis of the same concept of the abovementioned embodiments, the technical solutions of the abovementioned embodiments will be described in the embodiment through the following specific examples. Before description, referring to FIG. 5, an atypical application scenario of the specific examples is illustrated. In the scenario, a first network device may be a network-side device or a terminal device, and for example, is a network-side device such as a gNB in the scenario. A second network device is a terminal device. First signaling is DCI and second signaling is RRC signaling. Specifically, the first signaling includes N pieces of indication information, the gNB is required to schedule M slots for a data channel, and the number of symbols in each slot is, for example, 14. The data channel may specifically be a PDSCH, a PUSCH or a Physical Sidelink Shared Channel (PSSCH), and will not be specifically elaborated in the scenario.

Example 1

Figure 6:
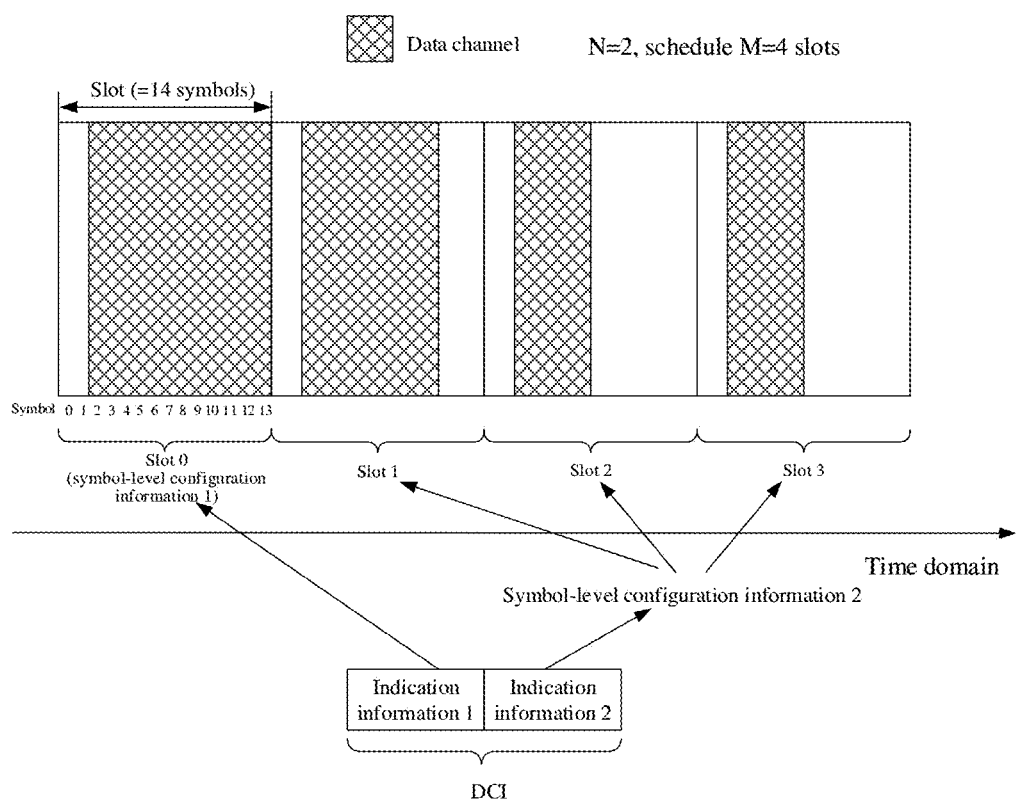
FIG. 6 is a schematic diagram of slot indication according to an embodiment of the disclosure.

Referring to schematic slot indication shown in FIG. 6, the gNB sends DCI including two pieces of indication information to the terminal device to indicate symbol-level time-domain resource configuration to be performed on four slots. Specifically, symbol-level time-domain resource configuration is performed on the first slot, i.e., slot 0, in the four slots through symbol-level configuration information 1 indicated by the first indication information in the two pieces of indication information; and symbol-level time-domain resource configuration is performed on the last three slots, i.e., slot 1, slot 2 and slot 3, in the four slots through symbol-level configuration information 2 indicated by the second indication information in the two pieces of indication information.

Specifically, the symbol-level configuration information may refer to a symbol for data transmission between the gNB and the terminal device in the slot 0. The first indication information may be an index of a certain piece of configuration information in P pieces of symbol-level configuration information in RRC signaling sent by the gNB before the DCI is sent, so that the terminal device may learn the symbol-level configuration information adopted for symbol-level time-domain resource configuration for the slot 0 according to the first indication information. The symbol-level configuration information indicated by the second indication information may be preset symbol-level configuration information or default symbol-level configuration information configured by SI.

For the specific example, when the gNB schedules multiple slots at one time for the terminal device, the gNB performs symbol-level time-domain resource configuration on a preset number (for example 1 to 2) of starting slots one by one and adopts unified preset or default symbol-level configuration information for symbol-level time-domain resource configuration over the subsequent slots. The specific example, compared with Solution 1 in the related art shown in FIG. 1, has the advantage that a signaling overhead can be reduced and, compared with Solution 2 in the related art shown in FIG. 2, has the advantage that configuration flexibility and efficiency can be remarkably improved.

Example 2

Figure 7:
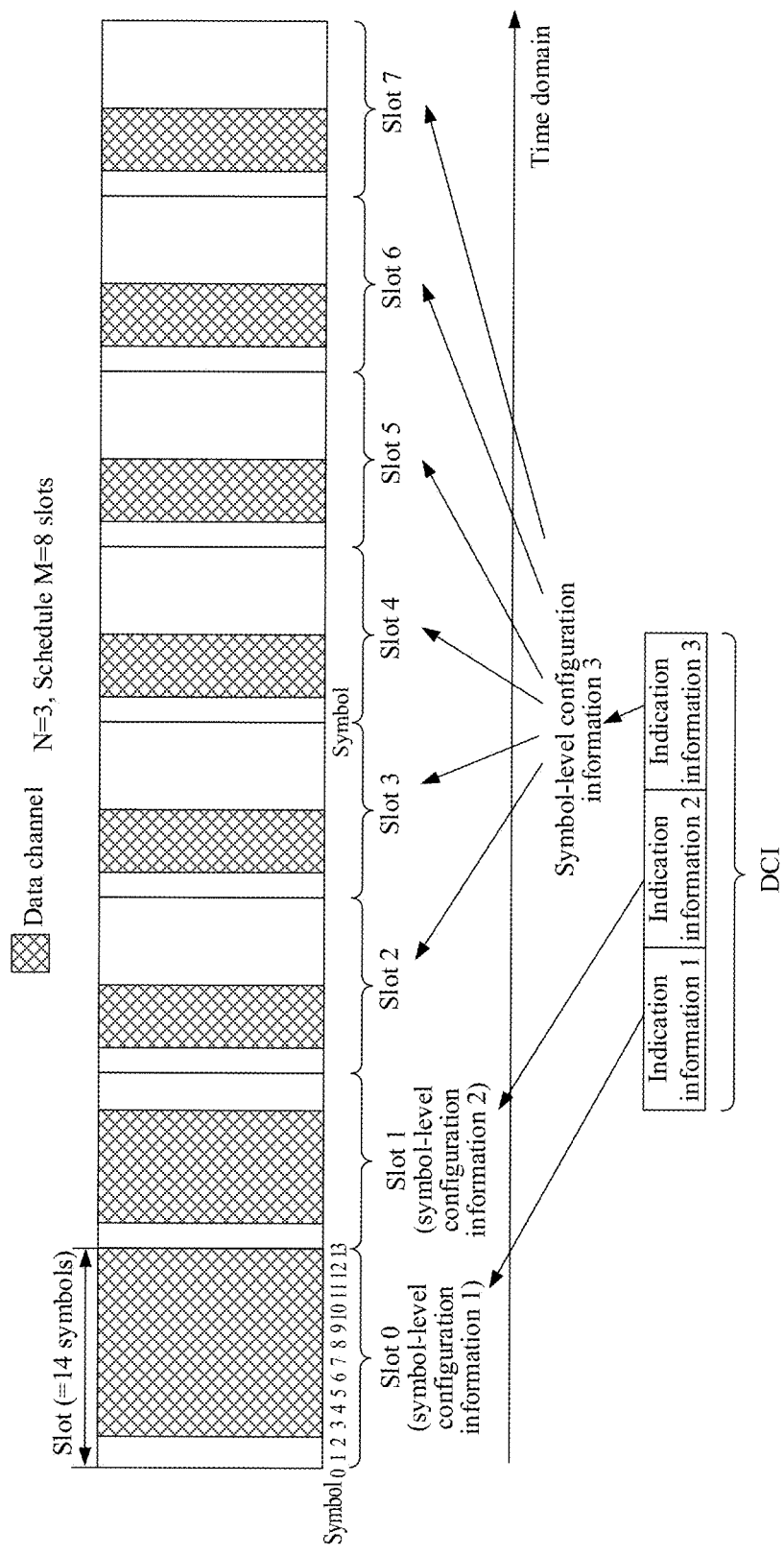
FIG. 7 is another schematic diagram of slot indication according to an embodiment of the disclosure.

Referring to schematic slot indication shown in FIG. 7, the gNB sends DCI including three pieces of indication information to the terminal device to indicate symbol-level time-domain resource configuration to be performed on eight slots. Specifically, symbol-level time-domain resource configuration is performed on slots 0 and 1 in the eight slots through symbol-level configuration information 1 and symbol-level configuration information 2 indicated by the first and second indication information in the three pieces of indication information respectively; and symbol-level time-domain resource configuration is performed on slots 2, 3, 4, 5, 6 and 7 through symbol-level configuration information 3 indicated by the third indication information in the three pieces of indication information.

For the specific example, when the gNB schedules multiple slots at one time for the terminal device, the gNB performs symbol-level time-domain resource configuration on a preset number (for example 1 to 2) of starting slots one by one and uniformly adopts the symbol-level configuration information indicated by the left indication information in the indication information to perform symbol-level time-domain resource configuration over the subsequent slots. Like specific example 1, the specific example, compared with Solution 1 in the related art shown in FIG. 1, has the advantage that the signaling overhead may be reduced and, compared with Solution 2 in the related art shown in FIG. 2, has the advantage that the configuration flexibility and efficiency may be remarkably improved.

Example 3

Figure 8:
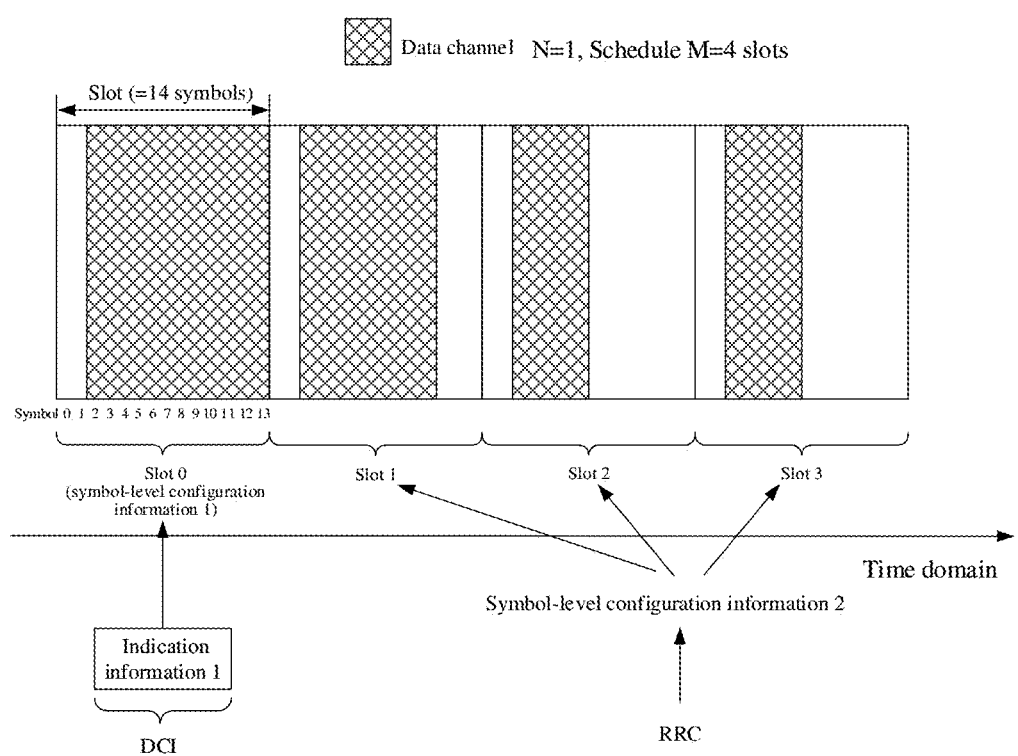
FIG. 8 is another schematic diagram of slot indication according to an embodiment of the disclosure.

Referring to schematic slot indication shown in FIG. 8, the gNB sends DCI including one piece of indication information to the terminal device to indicate symbol-level time-domain resource configuration to be performed over four slots. Specifically, symbol-level time-domain resource configuration is performed on the first slot, i.e., slot 0, in the four slots through symbol-level configuration information 1 indicated by one piece of indication information in the DCI; and symbol-level time-domain resource configuration is performed on the last three slots, i.e., slot 1, slot 2 and slot 3, in the four slots through specific symbol-level configuration information 2 in P pieces of symbol-level configuration information in an RRC message sent by the gNB to the terminal.

For the specific example, when the gNB schedules multiple slots at one time for the terminal device, the gNB performs symbol-level time-domain resource configuration on a preset number (for example, 1 to 2) of starting slots according to the indication information one by one and adopts the symbol-level information in RRC signaling to perform symbol-level time-domain resource configuration over the subsequent slots. Therefore, on the basis of specific example 1, the signaling overhead of DCI is further reduced, that is, the amount of indication information in the DCI is reduced from 2 to 1.

Example 4

Figure 9:
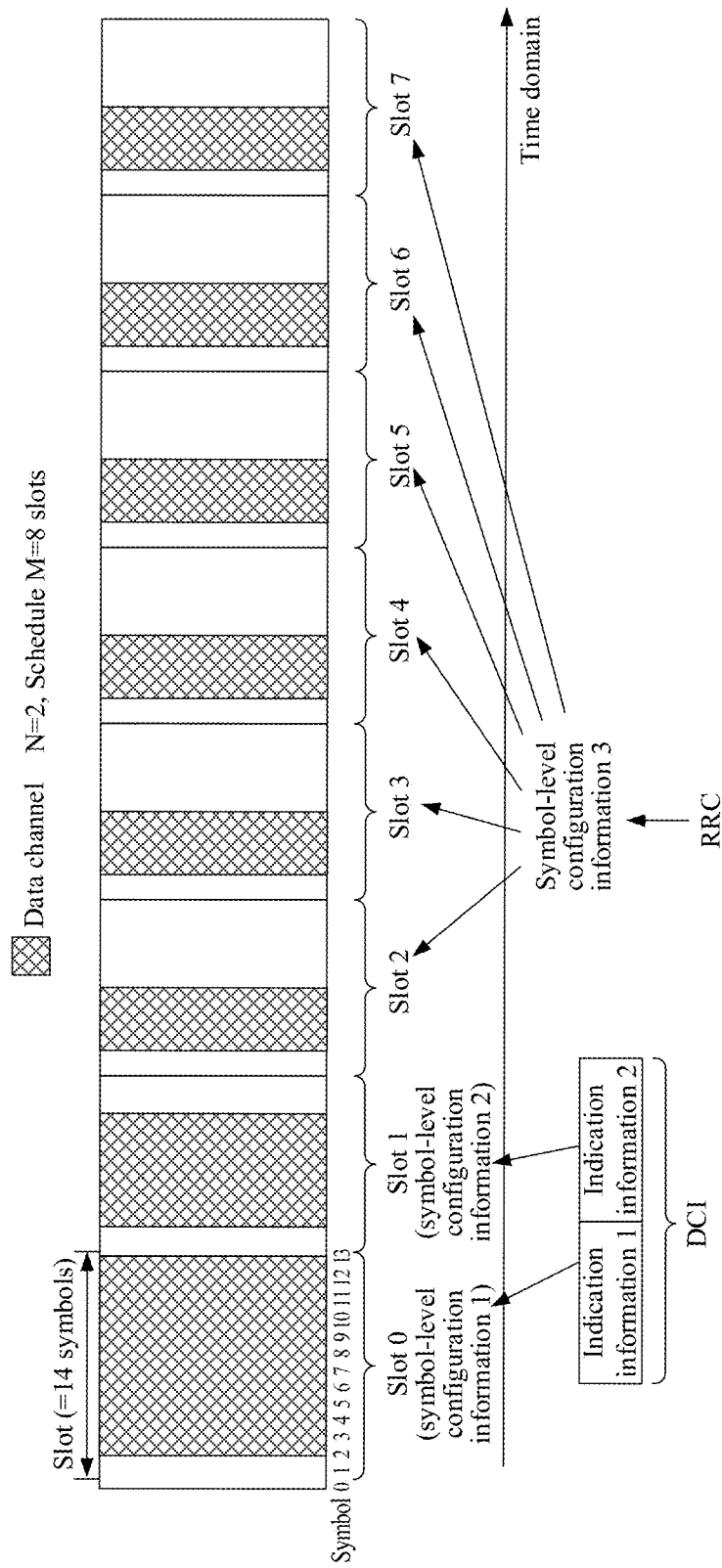
FIG. 9 is still another schematic diagram of slot indication according to an embodiment of the disclosure.

Referring to schematic slot indication shown in FIG. 9, the gNB sends DCI including two pieces of indication information to the terminal device to indicate symbol-level time-domain resource configuration to be performed over eight slots. Specifically, symbol-level time-domain resource configuration is performed on slots 0 and 1 in the eight slots through symbol-level configuration information 1 and symbol-level configuration information 2 indicated by the two pieces of indication information in the DCI respectively; and symbol-level time-domain resource configuration is performed on slots 2, 3, 4, 5, 6 and 7 through specific symbol-level configuration information 3 in P pieces of symbol-level configuration information in an RRC message sent to the terminal by the gNB.

For the specific example, it can be seen that the gNB adopts the symbol-level configuration information in RRC signaling to perform symbol-level time-domain resource configuration over the subsequent slots. Therefore, on the basis of specific example 2, the signaling overhead of DCI is further reduced, that is, the amount of the indication information in the DCI is reduced from 3 to 2.

Example 5

Figure 10:
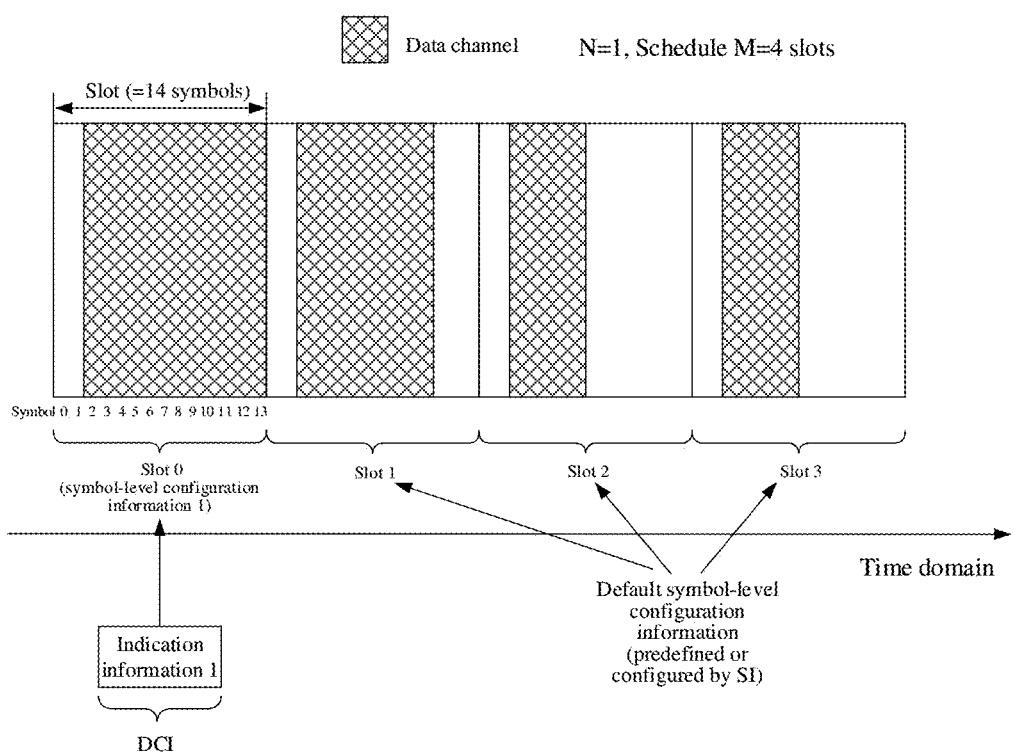
FIG. 10 is yet another schematic diagram of slot indication according to an embodiment of the disclosure.

Referring to schematic slot indication shown in FIG. 10, the gNB sends DCI including one piece of indication information to the terminal device to indicate symbol-level time-domain resource configuration to be performed over four slots. Specifically, symbol-level time-domain resource configuration is performed on the first slot, i.e., slot 0, in the four slots through symbol-level configuration information 1 indicated by the indication information in the DCI; and symbol-level time-domain resource configuration is performed on the last three slots, i.e., slot 1, slot 2 and slot 3, in the four slots through default symbol-level configuration information. For example, the default symbol-level configuration information may be predefined symbol-level configuration information, or may also be symbol-level configuration information configured by SI.

For the specific example, when the gNB schedules multiple slots at one time for the terminal device, the gNB performs symbol-level time-domain resource configuration on a preset number (for example, 1 to 2) of starting slots according to the indication information one by one and adopts the default symbol-level information to perform symbol-level time-domain resource configuration over the subsequent slots. Therefore, on the basis of specific example 3, no RRC information is required to be sent, and an RRC signaling overhead is reduced.

Example 6

Figure 11:
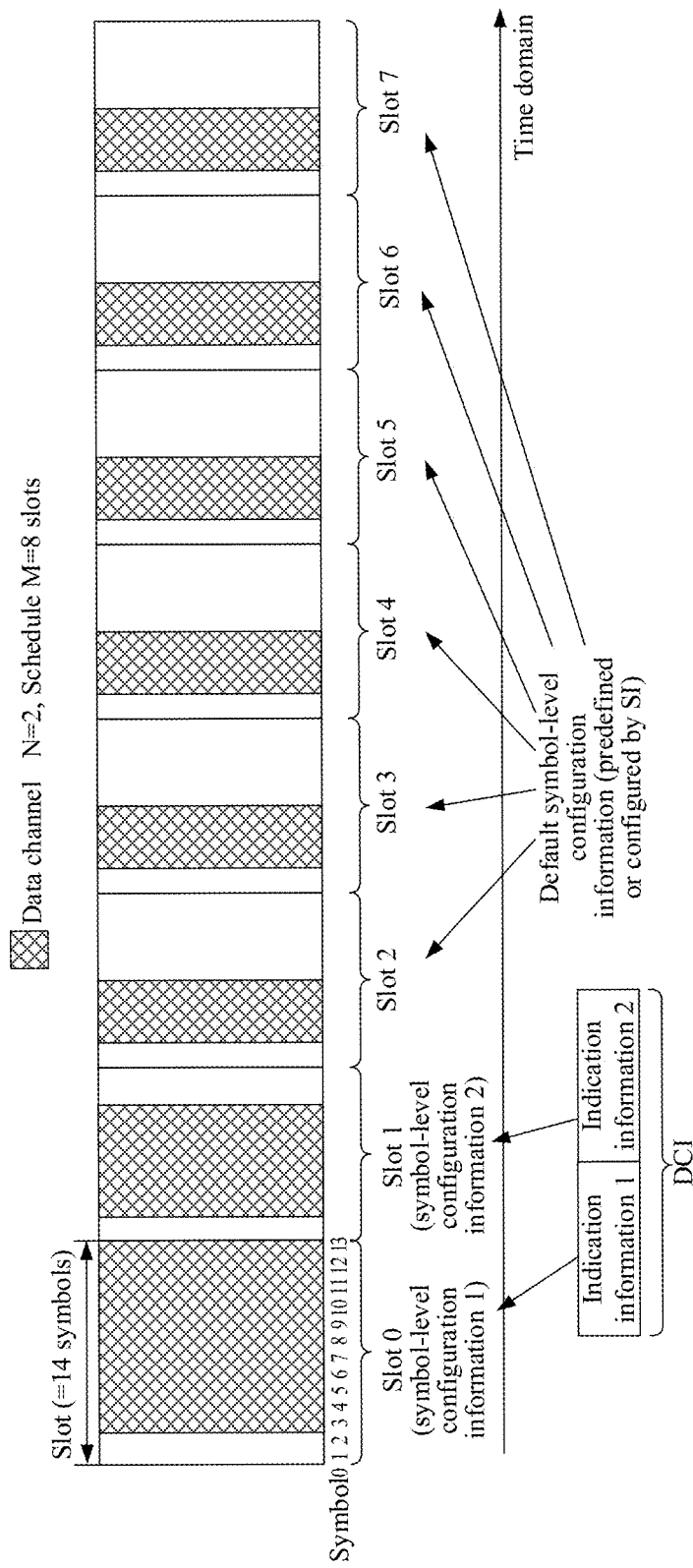
FIG. 11 is yet another schematic diagram of slot indication according to an embodiment of the disclosure.

Referring to schematic slot indication shown in FIG. 11, the gNB sends DCI including two pieces of indication information to the terminal device to indicate symbol-level time-domain resource configuration to be performed over eight slots. Specifically, symbol-level time-domain resource configuration is performed on slots 0 and 1 in the eight slots through symbol-level configuration information 1 and symbol-level configuration information 2 indicated by the two pieces of indication information in the DCI respectively; and symbol-level time-domain resource configuration is performed on slots 2, 3, 4, 5, 6 and 7 through default symbol-level configuration information. For example, the default symbol-level configuration information may be predefined symbol-level configuration information, or may also be symbol-level configuration information configured by SI.

For the specific example, when the gNB schedules multiple slots at one time for the terminal device, the gNB adopts default symbol-level information for symbol-level time-domain resource configuration over the subsequent slots. Therefore, on the basis of specific example 4, no RRC information is required to be sent, and the RRC signaling overhead is reduced.

From the specific examples, it can be seen that the amount of indication information is smaller than the number of the slots to be configured, so that symbol-level time-domain resource configuration may be performed on part of the slots according to an indication of the indication information, and a unified symbol-level time-domain resource configuration may be adopted for the other part. Therefore, compared with the solution in the present related art shown in FIG. 1 or FIG. 2, the technical solutions have the advantages that not only the flexibility in symbol-level configuration of the slots may be improved but also the signaling overhead may be reduced.

Embodiment 4

Figure 12:
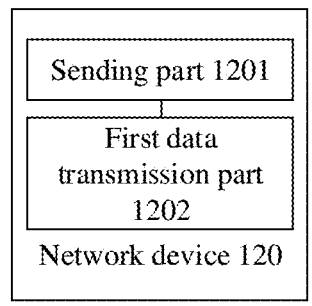
FIG. 12 is a schematic diagram of composition of a network device according to an embodiment of the disclosure.

On the basis of the same concept of the abovementioned embodiments, referring to FIG. 12, a network device 120 provided in the embodiment of the disclosure is illustrated. The network device 120 includes a sending part 1201 and a first data transmission part 1202.

Herein, the sending part 1201 is configured to send first signaling to a second network device, the first signaling including N pieces of indication information configured to indicate corresponding symbol-level configuration information, the first signaling being for configuring more than N slots according to the N pieces of symbol-level configuration information and the symbol-level configuration information being for configuring a symbol for data transmission in a slot.

The first data transmission part 1202 is configured to perform data transmission with the second network device according to the symbol-level configuration information corresponding to the indication information in the first signaling.

In a possible implementation mode, the sending part 1201 is further configured to send second signaling to the second network device.

Herein, the second signaling may include P pieces of symbol-level configuration information, and each piece of indication information in the N pieces of indication information in the first signaling corresponds to a piece of symbol-level configuration information in the P pieces of symbol-level configuration information.

In a possible implementation mode, the symbol-level configuration information includes a start symbol and terminal symbol for data transmission in the slot, or includes the start symbol for data transmission in the slot and a symbol number, or includes a bitmap indicating a symbol for data transmission in the slot.

In a possible implementation mode, when the number of the more than N slots is M and M is larger than N, N−1 pieces of first indication information in the N pieces of indication information of the first signaling correspond to the symbol-level configuration information of N−1 first slots in the M slots; and second indication information, other than the first indication information, in the N pieces of indication information corresponds to the symbol-level configuration information of M−N+1 second slots, other than the first slots, in the M slots.

In a possible implementation mode, when the number of the slots to be configured is M, N pieces of indication information of the first signaling correspond to the symbol-level configuration information of N third slots in the M slots; and the symbol-level configuration information of M−N fourth slots, other than the third slots, in the M slots is default symbol-level configuration information.

Specifically, the default symbol-level configuration information is predefined symbol-level configuration information, or is symbol-level configuration information configured by RRC signaling or SI.

In a possible implementation mode, the first signaling is born in DCI or born in an MAC CE.

In a possible implementation mode, when the number of the slots to be configured is M, N pieces of indication information of the first signaling correspond to symbol-level configuration information of N third slots in the M slots; and symbol-level configuration information of the M−N fourth slots, other than the third slots, in the M slots is preset symbol-level configuration information in the P pieces of symbol-level configuration information.

In a possible implementation mode, the second signaling is born in RRC signaling or born in an MAC CE.

It can be understood that, in the embodiment, "part" may be part of a circuit, part of a processor, part of a program or software and the like, of course, may also be a unit, and may also be a module or not a module.

In addition, each component in the embodiment may be integrated into a processing unit, each unit may also exist independently, and two or more than two units may also be integrated into a unit. The integrated unit may be implemented in a hardware form or may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of a software product, and the computer software product may be stored in a storage medium, including a plurality of instructions configured to enable a computer device (which may be a personal computer, a server, a network device or the like) or a processor to execute all or part of the steps of the methods in the embodiments. The storage medium may include various media capable of storing program codes such as a U disk, a mobile hard disk, a Read Only Memory (ROM), a Random Access Memory (RAM), a magnetic disk or an optical disk.

Therefore, the embodiment provides a computer-readable medium, which stores a resource indication program, the resource indication program being executable by at least one processor to implement the following steps:

sending first signaling to a second network device, the first signaling including N pieces of indication information configured to indicate corresponding symbol-level configuration information, the first signaling being for configuring more than N slots according to N pieces of symbol-level configuration information and the symbol-level configuration information being information configured to configure a symbol for data transmission in a slot; and performing data transmission with the second network device according to the symbol-level configuration information corresponding to the indication information in the first signaling.

Optionally, as another embodiment, the resource indication program when run by the processor is configured to further execute the following operation: sending second signaling to the second network device.

Herein, the second signaling may include P pieces of symbol-level configuration information, and each piece of indication information in the N pieces of indication information in the first signaling corresponds to a piece of symbol-level configuration information in the P pieces of symbol-level configuration information.

Optionally, as another embodiment, the symbol-level configuration information may include a start symbol and a terminal symbol for data transmission in the slot, or include the start symbol for data transmission in the slot and a symbol number, or include a bitmap indicating a symbol for data transmission in the slot.

Optionally, as another embodiment, when the number of the slots to be configured is M and M is larger than N, N−1 pieces of first indication information in the N pieces of indication information of the first signaling correspond to symbol-level configuration information of N−1 first slots in the M slots; and second indication information, other than the first indication information, in the N pieces of indication information corresponds to symbol-level configuration information of M−N+1 second slots, other than the first slots, in the M slots.

Optionally, as another embodiment, when the number of the slots to be configured is M, N pieces of indication information of the first signaling correspond to symbol-level configuration information of N third slots in the M slots; and symbol-level configuration information of M−N fourth slots, other than the third slots, in the M slots is default symbol-level configuration information.

Optionally, as another embodiment, the default symbol-level configuration information may be predefined symbol-level configuration information, or may be symbol-level configuration information configured by RRC signaling or SI.

Optionally, as another embodiment, the first signaling may be born in DCI or born in an MAC CE.

Optionally, as another embodiment, when the number of the slots to be configured is M, N pieces of indication information of the first signaling may correspond to symbol-level configuration information of N third slots in the M slots; and symbol-level configuration information of M−N fourth slots, other than the third slots, in the M slots may be preset symbol-level configuration information in the P pieces of symbol-level configuration information.

Optionally, as another embodiment, the second signaling may be born in RRC signaling or born in an MAC CE.

Figure 13:
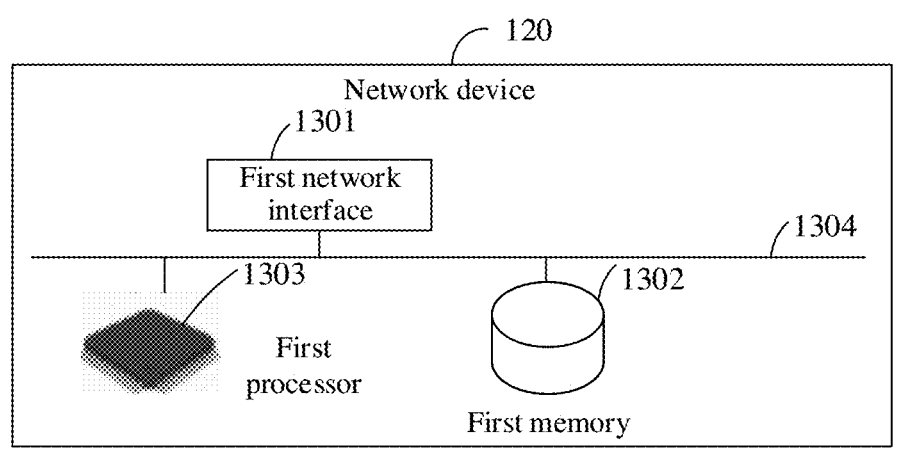
FIG. 13 is a schematic diagram of a hardware structure of a network device according to an embodiment of the disclosure.

On the basis of the network device 120 and the computer-readable medium, referring to FIG. 13, a specific hardware structure of the network device 120 provided in the embodiment of the disclosure is illustrated, which may include:

a first network interface 1301, a first memory 1302 and a first processor 1303. Each component is coupled together through a bus system 1304. It can be understood that the bus system 1304 is configured to implement connection communication between these components. The bus system 1304 includes a data bus and further includes a power bus, a control bus and a state signal bus. However, for clear description, various buses in FIG. 12 are marked as the bus system 1304. Herein, the first network interface 1301 is configured to receive and send a signal in a process of receiving and sending information with another external network element.

The first memory 1302 is configured to store a computer program capable of running in the first processor 1303.

The first processor 1303 is configured to run the computer program to execute the following operations:

sending first signaling to a second network device, the first signaling including N pieces of indication information configured to indicate corresponding symbol-level configuration information, the first signaling being for perform configuration on configured more than N slots according to N pieces of symbol-level configuration information and the symbol-level configuration information being information configured to configure a symbol for data transmission in a slot; and performing data transmission with the second network device according to the symbol-level configuration information corresponding to the indication information in the first signaling.

It can be understood that the first memory 1302 in the embodiment of the disclosure may be a volatile memory or a nonvolatile memory, or may include both the volatile and nonvolatile memory. The nonvolatile memory may be a ROM, a Programmable ROM (PROM), an Erasable PROM (EPROM), an Electrically EPROM (EEPROM) or a flash memory. The volatile memory may be a RAM, and is used as an external high-speed cache. It is exemplarily but unlimitedly described that various types of RAMs may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the first memory 1302 of a system and method described in the disclosure is intended to include, but not limited to, memories of these and any other proper types.

The first processor 1303 may be an integrated circuit chip with a signal processing capability. In an implementation process, each step of the method may be completed by an integrated logic circuit of hardware in the first processor 1303 or an instruction in a software form. The first processor 1303 may be a universal processor, a Digital Signal Processor (DSP), an Application Specific Integrated Circuit (ASIC), a Field Programmable Gate Array (FPGA) or another Programmable Logic Device (PLD), discrete gate or transistor logical device and discrete hardware component.

Each method, step and logical block diagram in the embodiments of the disclosure may be implemented or executed. The universal processor may be a microprocessor or the processor may also be any conventional processor and the like. The steps of the methods in combination with the embodiments of the disclosure may be directly executed and completed by a hardware decoding processor or executed and completed by a combination of hardware and software modules in a decoding processor. The software module may be located in a mature storage medium in this field such as a RAM, a flash memory, a ROM, a PROM or EEPROM and a register. The storage medium is located in the first memory 1302. The first processor 1303 reads information in the first memory 1302 and completes the steps of the method in combination with hardware.

It can be understood that these embodiments described in the disclosure may be implemented by hardware, software, firmware, middleware, a microcode or a combination thereof. In case of implementation with hardware, the processing unit may be implemented in one or more ASICs, DSPs, DSP Devices (DSPDs), PLDs, FPGAs, universal processors, controllers, microcontrollers, microprocessors, or other electronic units for executing the functions in the application or combinations thereof.

In case of implementation with software, the technology of the disclosure may be implemented through the modules (for example, processes and functions) executing the functions in the disclosure. A software code may be stored in the memory and executed by the processor. The memory may be implemented in the processor or outside the processor.

Optionally, as another embodiment, the first processor 1303 may be further configured to run the computer program to execute the following operation:

sending second signaling to the second network device.

Herein, the second signaling may include P pieces of symbol-level configuration information, and each piece of indication information in N pieces of indication information in the first signaling corresponds to a piece of symbol-level configuration information in the P pieces of symbol-level configuration information.

Optionally, as another embodiment, the symbol-level configuration information may include a start symbol and a terminal symbol for data transmission in the slot, or include a start symbol for data transmission in the slot and a symbol number, or include a bitmap indicating a symbol for data transmission in the slot.

Optionally, as another embodiment, when the number of the slots to be configured is M and M is larger than N, N−1 pieces of first indication information in the N pieces of indication information of the first signaling may correspond to symbol-level configuration information of N−1 first slots in the M slots; and second indication information, other than the first indication information, in the N pieces of indication information may correspond to symbol-level configuration information of M−N+1 second slots, other than the first slots, in the M slots.

Optionally, as another embodiment, when the number of the slots is M, N pieces of indication information of the first signaling may correspond to symbol-level configuration information of N third slots in the M slots; and symbol-level configuration information of M−N fourth slots other than the third slots in the M slots may be default symbol-level configuration information.

Optionally, as another embodiment, the default symbol-level configuration information may be predefined symbol-level configuration information, or may be symbol-level configuration information configured by RRC signaling or SI.

Optionally, as another embodiment, the first signaling may be born in DCI or born in a MAC CE.

Optionally, as another embodiment, when the number of the slots to be configured is M, N pieces of indication information of the first signaling may correspond to symbol-level configuration information of N third slots in the M slots; and symbol-level configuration information of M−N fourth slots other than the third slots in the M slots may be preset symbol-level configuration information in the P pieces of symbol-level configuration information.

Optionally, as another embodiment, the second signaling may be born in RRC signaling or born in an MAC CE.

Embodiment 5

Figure 14:
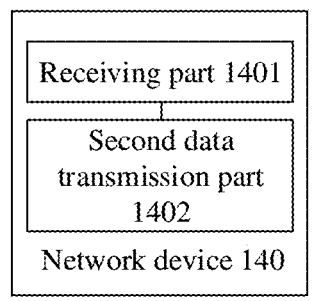
FIG. 14 is a schematic diagram of composition of another network device according to an embodiment of the disclosure.

On the basis of the same concept of the abovementioned embodiments, referring to FIG. 14, another network device 140 provided in the embodiment of the disclosure is illustrated, and may include a receiving part 1401 and a second data transmission part 1402.

The receiving part 1401 is configured to receive first signaling from a first network device.

Herein, the first signaling may include N pieces of indication information configured to indicate corresponding symbol-level configuration information, the first signaling is for performing configuration on more than N slots according to N pieces of symbol-level configuration information, and the symbol-level configuration information is for configuring a symbol for data transmission in a slot.

The second data transmission part 1402 is configured to perform data transmission with the first network device according to symbol-level configuration information corresponding to the indication information in the first signaling.

In a possible implementation mode, the receiving part 1401 may be further configured to receive second signaling from the first network device. The second signaling may include P pieces of symbol-level configuration information, and each piece of indication information in the N pieces of indication information in the first signaling may correspond to a piece of symbol-level configuration information in the P pieces of symbol-level configuration information.

In a possible implementation mode, when the number of the slots to be configured is M and M is larger than N, N−1 pieces of first indication information in the N pieces of indication information of the first signaling may correspond to the symbol-level configuration information of N−1 first slots in the M slots; and second indication information, other than the first indication information, in the N pieces of indication information may corresponds to the symbol-level configuration information of M−N+1 second slots, other than the first slots, in the M slots.

In a possible implementation mode, when the number of the slots to be configured is M, N pieces of indication information of the first signaling may correspond to the symbol-level configuration information of N third slots in the M slots; and the symbol-level configuration information of M−N fourth slots, other than the third slots, in the M slots may be default symbol-level configuration information.

In a possible implementation mode, when the number of the slots to be configured is M, N pieces of indication information of the first signaling may correspond to the symbol-level configuration information of N third slots in the M slots; and the symbol-level configuration information of M−N fourth slots, other than the third slots, in the M slots may be preset symbol-level configuration information in the P pieces of symbol-level configuration information.

It can be understood that, in the embodiment, "part" may be part of a circuit, part of a processor, part of a program or software and the like, of course, may also be a unit, and may also be modular and non-modular.

In addition, each component in the embodiment may be integrated into a processing unit, each unit may also exist independently, and two or more than two units may also be integrated into a unit. The integrated unit may be implemented in a hardware form, and may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of a software product, and the computer software product may be stored in a storage medium, including a plurality of instructions configured to enable a computer device (which may be a personal computer, a server, a network device or the like) or a processor to execute all or part of the steps of the methods in the embodiment. The storage medium may include various media capable of storing program codes such as a U disk, a mobile hard disk, a ROM, a RAM, a magnetic disk or an optical disk.

Therefore, the embodiment provides a computer-readable medium, which stores a resource indication program, the resource indication program being executable by at least one processor to implement the following steps:

receiving first signaling from a first network device, the first signaling including N pieces of indication information configured to indicate corresponding symbol-level configuration information, the first signaling being for perform configuration on configured more than N slots according to N pieces of symbol-level configuration information and the symbol-level configuration information being configured to configure a symbol for data transmission in a slot; and performing data transmission with the first network device according to the symbol-level configuration information corresponding to the indication information in the first signaling.

Optionally, as another embodiment, the resource indication program when run by the processor may further execute the following operation: receiving second signaling from the first network device. The second signaling may include P pieces of symbol-level configuration information, and each piece of indication information in the N pieces of indication information in the first signaling may correspond to a piece of symbol-level configuration information in the P pieces of symbol-level configuration information.

Optionally, as another embodiment, when the number of the slots to be configured is M and M is larger than N, N−1 pieces of first indication information in the N pieces of indication information of the first signaling may correspond to the symbol-level configuration information of N−1 first slots in the M slots; and second indication information, other than the first indication information, in the N pieces of indication information may correspond to the symbol-level configuration information of M−N+1 second slots, other than the first slots, in the M slots.

Optionally, as another embodiment, when the number of the slots to be configured is M, N pieces of indication information of the first signaling may correspond to symbol-level configuration information of N third slots in the M slots; and symbol-level configuration information of M−N fourth slots, other than the third slots, in the M slots may be default symbol-level configuration information.

Optionally, as another embodiment, when the number of the slots to be configured is M, N pieces of indication information of the first signaling may correspond to symbol-level configuration information of N third slots in the M slots; and symbol-level configuration information of the M−N fourth slots, other than the third slots, in the M slots may be preset symbol-level configuration information in the P pieces of symbol-level configuration information.

Figure 15:
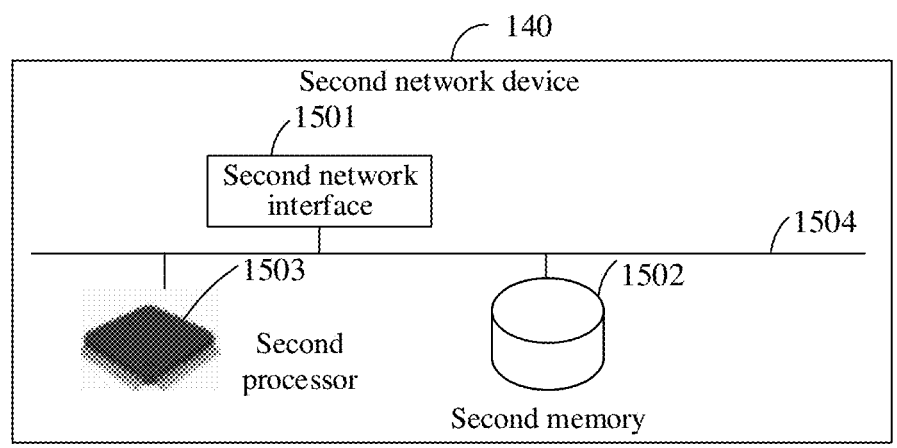
FIG. 15 is a schematic diagram of a hardware structure of another network device according to an embodiment of the disclosure.

On the basis of the network device 140 and the computer-readable medium, referring to FIG. 15, a specific hardware structure of the network device 140 provided in the embodiment of the disclosure is illustrated. The network device 140 may include a second network interface 1501, a second memory 1502 and a second processor 1504. It can be understood that the bus system 1504 is configured to implement connection communication between these components. The bus system 1504 may include a data bus and further includes a power bus, a control bus and a state signal bus. However, for clear description, various buses in FIG. 14 are marked as the bus system 1504. Herein, the second network interface 1501 is configured to receive and send a signal in a process of receiving and sending information from and to another external network element.

The second memory 1502 is configured to store a computer program capable of running in the second processor 1503.

The second processor 1503 is configured to run the computer program to execute the following operations:

receiving first signaling from a first network device.

The first signaling may include N pieces of indication information configured to indicate corresponding symbol-level configuration information, the first signaling being for configuring more than N slots according to N pieces of symbol-level configuration information and the symbol-level configuration information being configured to configure a symbol for data transmission in a slot; and performing data transmission with the first network device according to the symbol-level configuration information corresponding to the indication information in the first signaling.

It can be understood that the second memory 1502 in the embodiment of the disclosure may be a volatile memory or a nonvolatile memory, or may include both volatile and nonvolatile memories. The nonvolatile memory may be a ROM, a PROM, an EPROM, an EEPROM or a flash memory. The volatile memory may be a RAM, and is used as an external high-speed cache. It is exemplarily but unlimitedly described that various types of RAMs may be adopted, such as an SRAM, a DRAM, an SDRAM, a DDRSDRAM, an ESDRAM, an SLDRAM and a DR RAM. It is to be noted that the second memory 1502 of a system and method described in the disclosure is intended to include, but not limited to, memories of these and any other proper types.

The second processor 1503 may be an integrated circuit chip with a signal processing capability. In an implementation process, each step of the method may be completed by an integrated logic circuit of hardware in the second processor 1503 or an instruction in a software form. The second processor 1503 may be a universal processor, a DSP, an ASIC, an FPGA or other PLD, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the methods disclosed in combination with the embodiments of the disclosure may be directly embodied to be executed and completed by a hardware decoding processor or executed and completed by a combination of hardware and software modules in a decoding processor. The software module may be located in a mature storage medium in this field such as a RAM, a flash memory, a ROM, a PROM or EEPROM and a register. The storage medium may be located in the second memory 1502. The second processor 1503 may read information from the second memory 1502 and complete the steps of the method in combination with hardware.

It can be understood that these embodiments described in the disclosure may be implemented by hardware, software, firmware, middleware, a microcode or a combination thereof. In case of implementation with the hardware, the processing unit may be implemented in one or more ASICs, DSPs, DSPDs, PLDs, FPGAs, universal processors, controllers, microcontrollers, microprocessors, other electronic units configured to execute the functions in the application or combinations thereof.

In case of implementation with software, the technology of the disclosure may be implemented through modules (for example, processes and functions) executing the functions in the disclosure. A software code may be stored in the memory and executed by the processor. The memory may be implemented in the processor or outside the processor.

Optionally, as another embodiment, the second processor 1503 may be further configured to run the computer program to execute the following operation: receiving second signaling from the first network device, the second signaling including P pieces of symbol-level configuration information, and each piece of indication information in N pieces of indication information in the first signaling corresponding to a piece of symbol-level configuration information in the P pieces of symbol-level configuration information.

Optionally, as another embodiment, when the number of the slots to be configured is M and M is larger than N, N−1 pieces of first indication information in the N pieces of indication information of the first signaling may correspond to symbol-level configuration information of N−1 first slots in the M slots; and second indication information, other than the first indication information, in the N pieces of indication information may correspond to symbol-level configuration information of M−N+1 second slots, other than the first slots, in the M slots.

Optionally, as another embodiment, when the number of the slots to be configured is M, the N pieces of indication information of the first signaling may correspond to symbol-level configuration information of N third slots in the M slots; and symbol-level configuration information of M−N fourth slots, other than the third slots, in the M slots may be default symbol-level configuration information.

Optionally, as another embodiment, when the number of the slots to be configured is M, the N pieces of indication information of the first signaling may correspond to symbol-level configuration information of N third slots in the M slots; and symbol-level configuration information of M−N fourth slots, other than the third slots, in the M slots may be preset symbol-level configuration information in the P pieces of symbol-level configuration information.

Embodiment 6

Figure 16:
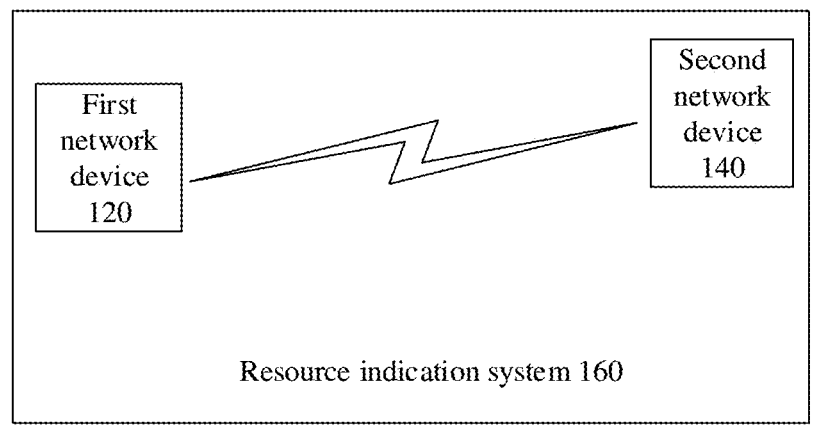
FIG. 16 is a schematic diagram of composition of a resource indication system according to an embodiment of the disclosure.

On the basis of the same concept of the abovementioned embodiments, referring to FIG. 16, a resource indication system 160 provided in the embodiment of the disclosure is illustrated, and may include a first network device 120 and a second network device 140. Herein, the first network device 120 is configured to send first signaling to the second network device 140, the first signaling including N pieces of indication information configured to indicate corresponding symbol-level configuration information, the first signaling being for configuring more than N slots according to N pieces of symbol-level configuration information and the symbol-level configuration information being information configured to configure a symbol for data transmission in a slot, and perform data transmission with the second network device 140 according to the symbol-level configuration information corresponding to the indication information in the first signaling.

The second network device 140 may be configured to receive the first signaling from the first network device 120, and perform data transmission with the first network device 120 according to the symbol-level configuration information corresponding to the indication information in the first signaling.

In a specific implementation process, the first network device 120 in the embodiment may preferably be the first network device 120 in any abovementioned embodiment, and the second network device 140 may preferably be the second network device 140 in any abovementioned embodiment.

Those skilled in the art should know that the embodiments of the disclosure may be provided as a method, a system or a computer program product. Therefore, the disclosure may adopt a hardware embodiment, software embodiment or combined software and hardware embodiment. Moreover, the disclosure may adopt a computer program product implemented on one or more computer-available storage media (including, but not limited to, a disk memory and an optical memory) including computer-available program codes.

The disclosure is described with reference to flowcharts and/or block diagrams of the method, device (system) and computer program product according to the embodiments of the disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that a device for realizing a function specified in one flow or multiple flows in the flowcharts and/or one block or multiple blocks in the block diagrams is generated by the instructions executed through the computer or the processor of other programmable data processing device.

These computer program instructions may also be stored in a computer-readable memory capable of guiding the computer or other programmable data processing device to work in a specific manner, so that a product including an instruction device may be generated by the instructions stored in the computer-readable memory, the instruction device realizing the function specified in one flow or multiple flows in the flowcharts and/or one block or multiple blocks in the block diagrams.

These computer program instructions may further be loaded onto a computer or other programmable data processing device, so that a series of operating steps can be executed on the computer or other programmable data processing device to generate processing implemented by the computer, and steps for realizing the function specified in one flow or multiple flows in the flowcharts and/or one block or multiple blocks in the block diagrams can be provided by the instructions executed on the computer or other programmable data processing device.

The above are only embodiments of the disclosure and not intended to limit the scope of protection of the disclosure.

INDUSTRIAL APPLICABILITY

In the embodiments, the amount of indication information is smaller than the number of slots to be configured, so that symbol-level configuration is performed for data transmission of M slots according to N pieces of indication information, M being larger than N. Therefore, symbol-level time-domain resource configuration may be performed on part of the slots according to an indication of the indication information, and a unified symbol-level time-domain resource configuration may be adopted for the other part of the slots to be configured. It is required to indicate the symbol-level configuration information of each slot to be configured, so that a signaling overhead is reduced. It is not required to indicate the symbol-level configuration information of all the slots to be configured uniformly either, so that symbol-level configuration flexibility is improved.

The invention claimed is:

1. A method for resource indication, comprising:
sending, by a network device, first signaling to a terminal device, wherein the first signaling comprises N pieces of indication information for indicating N pieces of symbol-level configuration information, the first signaling is configured to configure M slots according to the N pieces of symbol-level configuration information, and M is larger than N, and wherein each piece of symbol-level configuration information configures symbols for data transmission in a respective one of N slots, the each piece of symbol level configuration information corresponds to the respective one of N slots, and the symbol-level configuration information is configured to indicate whether each of the symbols for data transmission in each respective one of N slots performs an uplink data transmission or a downlink data transmission; and
performing, by the network device, data transmission with the terminal device according to the symbol-level configuration information corresponding to the indication information in the first signaling,
wherein the N pieces of indication information of the first signaling are for indicating the N pieces of symbol-level configuration information of the N slots in the M slots; symbol-level configuration information of M-N slots other than the N slots in the M slots is default symbol-level configuration information, and the default symbol-level configuration information is configured by System Information (SI).

2. The method of claim 1, wherein when configuring the M slots according to the N pieces of symbol-level configuration information, the first signaling is further configured to:
configure symbols in N slots among the M slots according to the N pieces of symbol-level configuration information.

3. The method of claim 1, wherein the N slots include different start symbols and terminal symbols for the data transmission.

4. The method of claim 3, wherein the N pieces of symbol-level configuration information corresponding to the N slots are indicated through different indication information.

5. A method for resource indication, comprising:
receiving, by a terminal device, first signaling from a network device, wherein the first signaling comprises N pieces of indication information for indicating N pieces of symbol-level configuration information, the first signaling is configured to configure M slots according to the N pieces of symbol-level configuration information, and M is larger than N, and wherein each piece of symbol-level configuration information configures symbols for data transmission in a respective one of N slots, the each piece of symbol level configuration information corresponds to the respective one of N slots, and the symbol-level configuration information is configured to indicate whether each of the symbols for data transmission in each respective one of N slots performs an uplink data transmission or a downlink data transmission; and
performing, by the terminal device, data transmission with the network device according to the symbol-level configuration information corresponding to the indication information in the first signaling,
wherein the N pieces of indication information of the first signaling are for indicating the N pieces of symbol-level configuration information of the N slots in the M slots; symbol-level configuration information of M-N slots other than the N slots in the M slots is default symbol-level configuration information, and the default symbol-level configuration information is configured by System Information (SI).

6. The method of claim 5, wherein when configuring the M slots according to the N pieces of symbol-level configuration information, the first signaling is further configured to:
configure symbols in N slots among the M configured slots according to the N pieces of symbol-level configuration information.

7. A device, comprising:
a processor; and
a network interface, connected with the processor and configured to be triggered by the processor to:
send first signaling to a terminal device, wherein the first signaling comprises N pieces of indication information for indicating N pieces of symbol-level configuration information, the first signaling is configured to configure M slots according to the N pieces of symbol-level configuration information, and M is larger than N, and wherein each piece of symbol-level configuration information configures symbols for data transmission in a respective one of N slots, the each piece of symbol level configuration information corresponds to the respective one of N slots, and the symbol-level configuration information is configured to indicate whether each of the symbols for data transmission in each respective one of N slots performs an uplink data transmission or a downlink data transmission; and
perform data transmission with the terminal device according to the symbol-level configuration information corresponding to the indication information in the first signaling,
wherein the N pieces of indication information of the first signaling are for indicating the N pieces of symbol-level configuration information of N slots in the M slots; symbol-level configuration information of M-N slots other than the N slots in the M slots is default symbol-level configuration information, and the default symbol-level configuration information is configured by System Information (SI).

8. The device of claim 7, wherein the network interface is further configured to send second signaling to the terminal device,
wherein the second signaling comprises P pieces of symbol-level configuration information and each of the N pieces of indication information in the first signaling corresponds to a piece of symbol-level configuration information in the P pieces of symbol-level configuration information respectively.

9. The device of claim 7, wherein the first signaling is for configuring symbols in N slots among the M slots according to the N pieces of symbol-level configuration information.

10. A device, comprising:
a processor; and
a network interface, connected with the processor and configured to be triggered by the processor to:
receive first signaling from a network device, wherein the first signaling comprises N pieces of indication information for indicating N pieces of symbol-level configuration information, the first signaling is configured to configure M slots according to the N pieces of symbol-level configuration information, and M is larger than N, wherein each piece of symbol-level configuration information configures symbols for data transmission in a respective one of N slots, the each piece of symbol level configuration information corresponds to the respective one of N slots, and the symbol-level configuration information is configured to indicate whether each of the symbols for data transmission in each respective one of N slots performs an uplink data transmission or a downlink data transmission; and
perform data transmission with the network device according to the symbol-level configuration information corresponding to the indication information in the first signaling,
wherein the N pieces of indication information of the first signaling are for indicating the N pieces of symbol-level configuration information of N slots in the M slots; symbol-level configuration information of M-N slots other than the N slots in the M slots is default symbol-level configuration information, and the default symbol-level configuration information is configured by System Information (SI).

11. The device of claim 10, wherein the network interface is further configured to receive second signaling from the network device, wherein the second signaling comprises P pieces of symbol-level configuration information, and each of the N pieces of indication information in the first signaling corresponds to a piece of symbol-level configuration information in the P pieces of symbol-level configuration information respectively.

12. The device of claim 10, wherein the first signaling is for configuring symbols in N slots among the M slots according to the N pieces of symbol-level configuration information.

* * * * *